United States Patent
Bousquet et al.

(10) Patent No.: US 9,355,140 B1
(45) Date of Patent: May 31, 2016

(54) ASSOCIATING AN ENTITY WITH A SEARCH QUERY

(71) Applicant: Google Inc., Mountain View, CA (US)

(72) Inventors: Olivier Jean Andre Bousquet, Zurich (CH); Oskar Sandberg, Zurich (CH); Sylvain Gelly, Olten (CH); Randolph Gregory Brown, Sunnyside, NY (US)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 13/801,814

(22) Filed: Mar. 13, 2013

Related U.S. Application Data

(63) Continuation of application No. 13/801,383, filed on Mar. 13, 2013.

(51) Int. Cl.
*G06F 17/30* (2006.01)

(52) U.S. Cl.
CPC ...... *G06F 17/30424* (2013.01); *G06F 17/3064* (2013.01)

(58) Field of Classification Search
None
See application file for complete search history.

(56) References Cited

U.S. PATENT DOCUMENTS

| | | | |
|---|---|---|---|
| 6,963,867 B2 | 11/2005 | Ford et al. | |
| 7,043,492 B1 | 5/2006 | Neal et al. | |
| 7,181,438 B1 | 2/2007 | Szabo | |
| 7,379,949 B2 | 5/2008 | Chowdhury | |
| 7,519,605 B2 | 4/2009 | Vailaya et al. | |
| 7,613,690 B2 | 11/2009 | Chowdhury et al. | |
| 7,676,452 B2 | 3/2010 | Doganata et al. | |
| 7,814,085 B1 | 10/2010 | Pfleger et al. | |
| 7,921,092 B2 | 4/2011 | Anick et al. | |
| 7,930,197 B2 | 4/2011 | Ozzie et al. | |
| 7,966,321 B2 | 6/2011 | Wolosin et al. | |
| 8,352,474 B2 | 1/2013 | Pickens et al. | |
| 8,386,483 B2 | 2/2013 | Boyer et al. | |
| 8,412,699 B1 | 4/2013 | Mukherjee et al. | |
| 8,423,392 B2 | 4/2013 | Moxley et al. | |
| 8,423,538 B1 * | 4/2013 | Sadikov et al. | 707/722 |
| 8,433,698 B2 | 4/2013 | Franks et al. | |
| 8,504,584 B1 | 8/2013 | Baker et al. | |
| 8,583,640 B2 | 11/2013 | Zhang et al. | |
| 8,583,670 B2 | 11/2013 | Cameron et al. | |
| 8,594,996 B2 | 11/2013 | Liang et al. | |
| 8,661,033 B2 | 2/2014 | Leppert et al. | |
| 9,043,314 B2 | 5/2015 | Chen et al. | |
| 2005/0289140 A1 | 12/2005 | Ford et al. | |
| 2007/0174257 A1 | 7/2007 | Howard | |
| 2008/0059452 A1 | 3/2008 | Frank | |

(Continued)

OTHER PUBLICATIONS

Miller, Report: Google Uses About 900,000 Servers Aug. 1, 2011, datacenterknowledge.com, http://www.datacenterknowledge.com/archives/2011/08/01/report-google-uses-about-900000-servers/.*
Our history in depth [date unknown], Google.com, http://www.google.com/about/company/history/.*

(Continued)

*Primary Examiner* — Jason Liao
(74) *Attorney, Agent, or Firm* — Middleton Reutlinger

(57) ABSTRACT

Methods and apparatus for associating an entity with at least one search query. Some implementations are directed to methods and apparatus for identifying multiple queries associated with an entity and identifying one or more of the queries as an entity search query that provides desired search results for the entity. Some implementations are directed to methods and apparatus for identifying a particular entity and, in response to identifying the particular entity, identifying an entity search query corresponding to the particular entity.

13 Claims, 6 Drawing Sheets

(56) References Cited

U.S. PATENT DOCUMENTS

| | | |
|---|---|---|
| 2008/0109435 A1 | 5/2008 | Stephens |
| 2010/0205198 A1 | 8/2010 | Mishne et al. |
| 2012/0010884 A1 | 1/2012 | Kocks et al. |
| 2012/0059838 A1 | 3/2012 | Berntson et al. |
| 2012/0130976 A1 | 5/2012 | Cone et al. |
| 2012/0158738 A1 | 6/2012 | Buehrer et al. |
| 2013/0132362 A1 | 5/2013 | Jones et al. |
| 2013/0159081 A1 | 6/2013 | Shastry et al. |
| 2013/0238584 A1 | 9/2013 | Hendry |
| 2013/0246405 A1 | 9/2013 | Annau et al. |
| 2013/0282710 A1 | 10/2013 | Raghavan et al. |
| 2013/0297324 A1 | 11/2013 | Phillips et al. |
| 2013/0297351 A1 | 11/2013 | Phillips et al. |
| 2014/0025672 A1 | 1/2014 | Zhang et al. |

OTHER PUBLICATIONS

Autocomplete [date unknown], Google.com, https://support.google.com/websearch/answer/106230?hl=en.*

Levy et al., TechBytes: Google Instant Sep. 9, 2010, abcnews.go.com, http://abcnews.go.com/Technology/AheadoftheCurve/techbytes-google-instant/story?id=11591722.*

Broughton, Wikipedia: The Missing Maual Jan. 25, 2008, Section 16.3 http://techbus.safaribooksonline.com/book/web-applications-and-services/9780596515164/getting-readers-to-the-right-article-naming-redirects-and-disambiguation/for__multiple__meanings__disambiguation.*

Connolly, Hypertext Markup Language—2.0 Nov. 1995, Network Working Group, RFC 1866, https://tools.ietf.org/html/rfc1866.*

Chaudhuri, Evaluating Top-k Selection Queries; Sep. 1999; VLDB vol. 99; pp. 397-410.

* cited by examiner

ASSOCIATING AN ENTITY WITH A SEARCH QUERY

CROSS REFERENCE TO RELATED APPLICATIONS

This application is a continuation under 35 U.S.C. §120 of U.S. patent application Ser. No. 13/801,383, filed Mar. 13, 2013, and entitled "Associating an Entity with a Search Query", which is incorporated by reference herein in its entirety.

BACKGROUND

This specification is directed generally to digital information retrieval and, particularly to associating an entity with at least one search query.

Internet search engines provide information about Internet accessible documents such as web pages, images, text documents, and/or multimedia content. A search engine may identify the documents in response to a user's search query that includes one or more search terms and/or phrases. The search engine ranks the documents based on the relevance of the documents to the query and the importance of the documents and provides search results that link to the identified documents. The search results may be presented to the user in an order that is based on the rank of the search results. The rank of each search result may be based on a score assigned to the search result based on one or more scoring functions.

SUMMARY

The present disclosure is directed to methods and apparatus for associating an entity with at least one search query. For example, some implementations are directed to methods and apparatus for identifying multiple queries associated with an entity and identifying one or more of the queries as an entity search query that provides desired search results for the entity. Also, for example, some implementations are directed to methods and apparatus for identifying a particular entity (e.g., via a search request for the particular entity) and, in response to identifying the search request, identifying an entity search query corresponding to the particular entity.

In some implementations a computer implemented method may be provided that includes the steps of: identifying a query suggestion associated with a single entity; identifying an entity search query associated with the single entity of the query suggestion; and associating the query suggestion with the entity search query so that a user selection of the query suggestion issues a search based on the entity search query.

This method and other implementations of technology disclosed herein may each optionally include one or more of the following features.

The method may further include the steps of: identifying a user selection of the query suggestion; and issuing a search based on the entity search query in response to the user selection of the query suggestion. The query suggestion associated with a single entity may be a query suggestion annotated with at least one property of the single entity. The method may further include the step of receiving a query, wherein the query suggestion is based on the query. The query may be a submitted search query, and the method may further include the step of providing the query suggestion in combination with search results responsive to the search query. The query may be a partial search query, and the method may further include the step of providing the query suggestion as an autocomplete query suggestion for the partial search query.

The entity search query may be identified based on an entity to query mapping. The query suggestion may include first terms and the entity search query may include at least one second term that is unique from the first terms. The query suggestion may be responsive to a search query associated with a plurality of entities, the single entity being one of the entities.

The query suggestion associated with the single entity may be a query suggestion annotated with at least one property of the single entity. The method may further include the step of identifying the plurality of entities based on a query to entity mapping.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein analyze one or more aspects of an entity, queries associated with the entity, and/or documents identified in response to the queries associated with the entity to create an association between an entity and one or more queries. These associations represent new aspects of entities and queries that may be derived from a mapping of queries to entities. The associations may be utilized by one or more applications, such as a search system and/or a query suggestion system, to provide improved search results to users of the applications.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Figure 1:
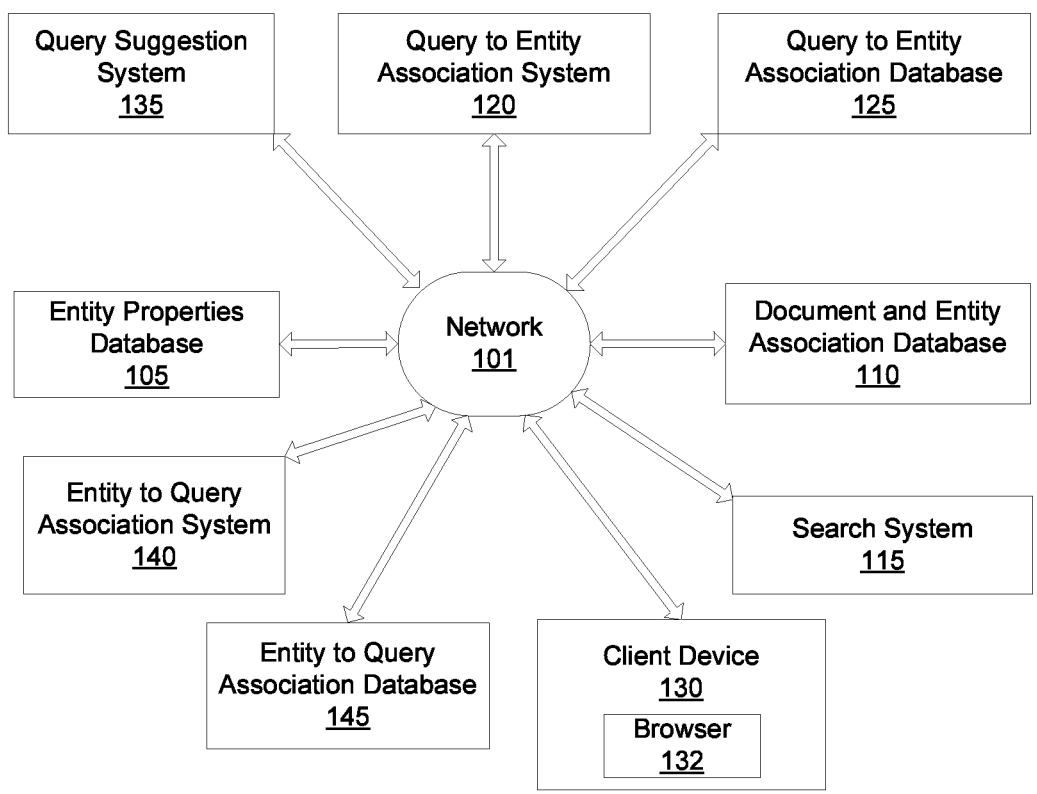
FIG. 1 illustrates a block diagram of an example environment in which an entity may be associated with an entity search query; a search query may be associated with at least one entity; and/or an entity search query may be identified for a selected entity.

FIG. 1 illustrates a block diagram of an example environment in which an entity may be associated with at least one entity search query; a search query may be associated with at least one entity; and/or an entity search query may be identified for a selected entity. In some implementations entities are topics of discourse. In some implementations, entities are persons, places, concepts, and/or things that can be referred to by a text fragment (e.g., a term or phrase) and are distinguishable from one another (e.g., based on context). For example, the text "bush" on a webpage may potentially refer to multiple entities such as President George Herbert Walker Bush, President George Walker Bush, a shrub, and the rock band Bush. Also, for example, the text "sting" may refer to the musician Gordon Matthew Thomas Sumner or the wrestler Steve Borden.

In some implementations an entity may be referenced by a unique entity identifier that may be used to identify the entity. The unique entity identifier may be associated with one or more properties associated with the entity. For example, in some implementations the entity properties database 105 may include properties associated with unique identifiers of one or more entities. For example, a unique identifier for the entity associated with the wrestler Steve Borden may be associated with a name or alias property of "Sting", another alias property of "Steve Borden", an occupation property of "wrestler", and/or a birthdate property of "Mar. 20, 1959" in the entity properties database 105. Additional and/or alternative properties may be associated with an entity in one or more databases such as entity properties database 105. In some examples in this specification, an entity may be referenced with respect to a unique entity identifier. In some examples, the entity may be referenced with respect to one or more alias and/or other property of the entity.

The example environment of FIG. 1 includes a client device 130, the entity properties database 105, a document and entity association database 110, a search engine 115, a query to entity association system 120, a query to entity association database 125, a query suggestion system 135, an entity to query association system 140, and an entity to query association database 145. The environment also includes a communication network 101 that enables communication between various components of the environment. In this specification, the term "database" will be used broadly to refer to any collection of data. The data of a database does not need to be structured in any particular way, or structured at all, and it can be stored on storage devices in one or more locations. Thus, for example, the entity properties database 105 may include multiple collections of data, each of which may be organized and accessed differently.

In some implementations the entity properties database 105 may include a database of structured data that includes nodes that represent entities and identifies the type of each entity represented by a node. A node representing an entity may also be associated with metadata in the database of structured data (e.g., via links that represent properties of the entity). Any included metadata may include, for example, names/aliases for the entity, resource locators of resources that are about the entity, descriptive information about the entity, among other data. Each node in the online database of structured data may be associated with an entity identifier for the entity that can be used to identify the entity and that optionally remains constant. For example, if a person represented by a node changes their legal name, a unique identifier for the node representing the person may remain constant while the metadata that identifies the person's legal name can be changed to reflect the change to the person's legal name.

In some implementations the entity properties database 105 may include links between nodes and data that identifies the relationship between entities represented by linked nodes. An example of an online database of structured data that exists is the FREEBASE database. Other sources may include online encyclopedias having pages directed to each of a group of entities and websites directed to particular types of entities (e.g., actors, directors, producers, politicians, sports stars). Other sources may also include one or more database of structured data that is not freely accessible online. As discussed herein, in some implementations the entity properties database 105 may be utilized by the search system 115, the query to entity association system 120, the query suggestion system 135, and/or the entity to query association system 140.

The query to entity association database 125 may include an index of queries and associated entities. For example, for each query, a mapping (e.g., data defining an association) between the query and one or more entities related with the query may be identified in the query to entity association database 125. In some implementations the query to entity association database 125 may be generated by the query to entity association system 120 and/or utilizing the method of FIG. 7. The query to entity association system 120 may include memory for storage of data and software applications, a processor for accessing data and executing applications, and components that facilitate communication over a communication network 101. In some implementations the query to entity association database 125 may be generated utilizing alternative apparatus and/or method. In some implementations the query to entity association database 125 may be utilized by the entity to query association system 140, the search system 115, the query suggestion system 135, and/or one or more additional and/or alternative components. For example, in some implementations, the search system 115 may identify one or more entities associated with a received query and provide information related to the entity as part of the search results. For example, an entity associated with a received search query may be identified via the query to entity association database 125 and an entity summary that includes information about the entity may be provided along with the search results. In some implementations the search system 115 may perform one or more of the steps of the method of FIG. 4.

In some implementations one or more aspects of information about the entity may be obtained from the entity properties database 105. For example, in some implementations the query to entity association database 125 may associate only one or more unique entity identifiers of one or more entities with a given query and one or more properties of the entities may be obtained from the entity properties database 105 based on the unique entity identifiers. In some implementations one or more properties of the entity may be obtained from the query to entity association database 125 itself. For example, the query to entity association database may 125 associate a given entity with one or more entity properties such as properties to be provided in entity summaries for that entity.

Also, for example, in some implementations, the query suggestion system 135 may identify one or more entities associated with a received query via the query to entity association database 125. The query suggestion system 135 may provide one or more query suggestions based on the identified entities, with each of the query suggestions being particularly formulated to focus on a particular entity. For example, the musician Gordon Matthew Thomas Sumner and the wrestler Steve Borden may be associated with the query "sting" in the query to entity association database 125. In response to a received query "sting", the query suggestion system 135 may identify the musician Gordon Matthew Thomas Sumner as the dominant entity from the query to entity association database 125 and suggest an alternative query suggestion to the user, with the alternative query suggestion being particularly formulated for the musician Gordon Matthew Thomas Sumner (e.g., "sting musician").

Also, for example, the query suggestion system 135 may identify multiple entities associated with a received query via the query to entity association database 125 and the query suggestion system 135 may suggest alternative query suggestions based on the identified multiple entities. Each of the alternative query suggestions may be particularly formulated for a given of the multiple entities. For example, both the musician Gordon Matthew Thomas Sumner and the wrestler Steve Borden may be associated with the query "sting" in the query to entity association database 125. In response to a received query "sting", the query suggestion system 135 may identify both the musician Gordon Matthew Thomas Sumner and the wrestler Steve Borden from the query to entity association database 125 and suggest two alternative query suggestions, with each being particularly formulated for one of the entities. For example, the query suggestion system 135 may provide a first query suggestion of "sting musician" and a second query suggestion of "sting wrestler."

The query that is actually submitted in response to a user selection of a query suggestion for an entity may be based on an entity search query that is associated with that entity. As discussed herein, in some implementations an entity search query associated with an entity may be obtained via the entity to query association system 140 and/or the entity to query association database 145. The entity to query association system 140 may include memory for storage of data and software applications, a processor for accessing data and executing applications, and components that facilitate communication over a communication network 101

The entity to query association database 145 may include an index of entities and associated entity search queries. For example, for each entity, a mapping (e.g., data defining an association) between the entity and one or more entity search queries related with the entity may be identified in the entity to query association database 145. In some implementations one or more entities of the entity to query association database 145 may contain only a single entity search query associated therewith. For example, in some implementations the single query for an entity may be a query identified as providing desired search results for that entity. In some implementations the single query may be identified as providing desired search results for that entity utilizing the steps of the method of FIG. 3.

In some implementations one or more entities of the entity to query association database 145 may contain multiple entity search queries associated therewith. For example, in some implementations a first entity search query for an entity may be a query identified as identifying desired search result documents for the entity for a first intended application and a second entity search query for the entity may be identified as identifying desired search result documents for the entity for a second intended application unique from the first intended application. For example, the first intended application may be providing search results for display for a user and the second intended application may be an entity fact mining application. For example, for the entity associated with Sting the singer a query "sting musician" may display more popular search results and be associated with the providing search results for display application whereas a query "sting gordon sumner" may provide search results more narrowly focused on the entity and be associated with the entity fact mining application. In some implementations the entity to query association database 145 may be utilized by the entity to query association system 140, the search system 115, the query suggestion system 135, and/or one or more additional and/or alternative components.

In some implementations the query suggestion provided by the query suggestion system 135 and the query actually submitted in response to the provided query suggestion may differ. For example, if the provided query suggestion is "sting musician" and the user chooses that query suggestion, a query of "sting Gordon Sumner" may be submitted to the search system 115. In some of those implementations the query of "sting Gordon Sumner" may be an entity search query for that entity from entity to query association database 145. In some of those implementations the query suggestion of "sting musician" may be based on properties from entity properties database 105 for that entity, such as one or more of the most popular properties.

In some implementations the query suggestion system 135 may provide a query suggestion to a user and, if the user chooses the query suggestion, may submit a query that strictly conforms to the provided query suggestion. For example, if the provided query suggestion is "sting musician" and the user chooses that query suggestion, a query of "sting musician" may be submitted to the search system 115. In some of those implementations the query suggestion and the and the query may be an entity search query for that entity from entity to query association database 145.

In some implementations the query suggestion system 135 may provide suggested queries for display with search results. For example, suggested queries may be provided in combination with search results such as search results of FIGS. 2A-2B. In some implementations the query suggestion system 135 may provide query suggestions for display in and/or adjacent to a search field. For example, the query suggestion system 135 may provide query suggestions as a user is formulating a query as illustrated, for example, in FIG. 6. In some implementations the query suggestion system 135 may perform one or more of the steps of the method of FIG. 5.

In some implementations one or more aspects of a provided query suggestion may be obtained from the entity properties database 105. For example, in some implementations the query suggestion system 135 may associate only one or more unique entity identifiers of one or more entities with a given query and one or more properties of the entities provided in a provided query suggestion may be obtained from the entity properties database 105 based on the unique entity identifiers. For example, in response to a received query "sting", the query suggestion system 135 may identify the musician Gordon Matthew Thomas Sumner from the query to entity association database 125 and suggest an alternative query suggestion of "sting musician". The alternative query suggestion of "sting musician" may be identified based on the entity properties database 105. For example, in some implementations properties (e.g., "musician") associated with an entity in the entity properties database 105 may be ranked and one or more of the highest ranked properties may be appended to the query to create an alternative query suggestion. In some implementations one or more aspects of the information about the entity may be obtained from the query to entity association database 125 itself.

In some implementations one or more aspects of any search query associated with a given entity may be obtained from the entity to query association system 140 and/or the entity to query association database 145. The entity to query association system 140 and/or the entity to query association database 145 may associate each of a plurality of entities with one or more entity search queries that provide desired search results specific to the entity. For example, the entity to query association database 145 may associate the musician Gordon Matthew Thomas Sumner with the entity search query "sting musician". In some implementations the provided query suggestion may additionally and/or alternatively be obtained from the entity to query association database 145. For example, in some implementations the provided query suggestion may be the same as the search query submitted in response to user selection of the query suggestion. In some implementations the provided query suggestion may be obtained from the entity properties database 105 and the search query submitted in response to selection of the query suggestion may be obtained from the entity to query association database 145.

The document and entity association database 110 may include an index of documents and associated entities. For example, for each of a plurality of documents, a mapping (e.g., data defining an association) between the document and one or more entities related with the document may be identified in the document and entity association database 110. A document is any data that is associated with a document address. Documents include HTML pages, word processing documents, portable document format (PDF) documents, images, video, and feed sources, to name just a few. The documents may include content such as, for example: words, phrases, pictures, etc.; embedded information (such as meta information and/or hyperlinks); and/or embedded instructions (such as JavaScript scripts).

In some implementations the document and entity association database 110 may be accessible to the query to entity association system 120 in determining associations between a given query and one or more entities associated with the query. For example, in some implementations, the query to entity association system 120 may associate a given query with an entity based on association of the entity with one or more documents that are responsive to a search based on the query. In some implementations the document and entity association database 110 may be accessible to the entity to query association system 140 in determining associations between a given entity and one or more search queries associated with the entity. For example, in some implementations, the query association system 140 may associate a given entity with a query based on association of the entity with one or more documents that are responsive to a search based on the query.

In some implementations an association between a document and an entity may be based on presence of one or more properties of the entity in the document. For example, an association between a document and an entity may be based on an importance of one or more alias of the entity in the document. For example, appearance of an alias of an entity in important fields and/or with great frequency in a document may be indicative of association of the entity to the document. Also, for example, an association between a document and an entity may be based on presence of additional and/or alternative properties of an entity such as date of birth, place of birth, height, weight, population, geographic location(s), type of entity (e.g., person, actor, location, business, university), etc.

In some implementations an association between a document and an entity may be based on presence in the document of one or more other entities related the entity. For example, links between entities may be identified from a database such as entity properties database 105. For example, the entity properties database 105 may include spouse information for an entity and an association between a document and a person may be based on occurrence of a spouse of the person in the document. For example, if a person's alias is ambiguous, presence of an alias of the person's spouse in a document along with the person's alias may be more indicative of the person being associated with the document than if the person's alias appeared in the document without the alias of the person's spouse. Also, for example, an association between a document and an entity may be based on presence of additional and/or alternative entities associated with a given entity, such as co-workers, co-stars, similar types of businesses, etc. Additional and/or alternative factors may be utilized in associating a document with one or more entities. Also, for example, an association between a document and an entity may be identified based on association between that entity and other entities in the document. For example, an entity may be associated with one or more additional entities based on co-occurrence of those entities in documents of a corpus of documents and/or based on other identified link such as hyperlinks between a document describing the entity and another document describing one of the additional entities. For example, a document may contain the term "Sting" and may also contain the term "wrestler". Based on an association between the entity associated with the wrestler Sting and the entity representing the concept of wrestling, the entity associated with the wrestler Sting may be identified as associated with the document.

In some implementations a user may interact with the search system 115 through a client computing device 130. The computing device 130 may be, for example, a desktop computer, a laptop computer, a cellular phone, a smartphone, a personal digital assistant (PDA), a tablet computer, a navigation system, or another computing device. The computing device 130 and the search system 115 each include memory for storage of data and software applications, a processor for accessing data and executing applications, and components that facilitate communication over a communication network 101. The operations performed by the client computing device 130 and/or the search system 115 may be distributed across multiple computer systems.

The computing device 130 executes one or more applications, such as web browsers (e.g., web browser 132), that enable the user to submit queries to the search system 115. In some implementations queries may be submitted directly to the search system 115 from the computing device 130. In some implementations queries may be submitted from one or more other components to the search system 115.

The search system 115 is an example of an information retrieval system in which the systems, components, and techniques described herein may be implemented and/or with which the systems, components, and techniques described herein may interface. The search system 115 receives queries from the client device 130 and/or other component (e.g., query to entity association system 120 and/or entity to query association system 140) and returns results in response to the queries. For example, in response to a query from the computing device 130, the search system 115 may transmit a plurality of search results to be displayed in the web browser 132 that is executing on the computing device 130. Each query is a request for information. The query can be, for example, in a text form and/or in other forms such as, for example, audio form and/or image form. Other computer devices may submit search queries to the search system 115 such as a server implementing a service for a website that has partnered with the provider of the search system 115. For brevity, however, the examples are described in the context of the client device 130, the query to entity association system 120, the entity to query association system 140, and/or the query suggestion system 135.

In some implementations, as described herein, the entity to query association system 140, the query to entity association system 120, and/or the query suggestion system 135 may additionally interact with the search system 115. For example, as described with respect to the method of FIG. 3, in some implementations the entity to query association system 140 may interface with the search system 115 in associating an entity with an entity search query based on the query score.

The search system 115 may include an indexing engine and a ranking engine. The indexing engine maintains an index for use by the search system 115. The indexing engine processes documents and updates index entries in the index, for example, using conventional and/or other indexing techniques.

The ranking engine uses the index to identify documents responsive to a submitted query, for example, using conventional and/or other information retrieval techniques. The ranking engine calculates scores for the documents responsive to the query, for example, using one or more ranking signals. Each signal provides information about the document itself and/or the relationship between the document and the query. One example signal is a measure of the overall quality of the document. Another example signal is a measure of the number of times the terms of the query occur in the document. Additional and/or alternative signals can also be used.

For example, additional and/or alternative signals include information about the query itself such as, for example, the terms of the query, an identifier of the user who submitted the query, and/or a categorization of the user who submitted the query (e.g., the geographic location from where the query was submitted, the language of the user who submitted the query, interests of the user who submitted the query, and/or a type of the client device 130 used to submit the query (e.g., mobile device, laptop, desktop)). The identification of the user can be, for example, a user name or the IP address of the client device 130. The geographic location from where the query was submitted can be, for example, a continent, a country, a state, a city, or geographic coordinates, such as latitude and longitude.

Signals may also include information about the terms of the query such as, for example, the locations where a query term appears in the title, body, and text of anchors in a document, where a query term appears in anchors pointing to the search result, how a term is used in the document (e.g., in the title of the document, in the body of the document, or in a link in the document), the term frequency (i.e., the number of times the term appears in a corpus of documents in the same language as the query divided by the total number of terms in the corpus), and/or the document frequency (i.e., the number of documents in a corpus of documents that contain the query term divided by the total number of documents in the corpus).

Further examples of signals include information about the document, for example, a measure of the quality of the document, a measure of the popularity of the document, the URL of the document, the geographic location where the document is hosted, when the search system 115 first added the document to the index database, the language of the document, the size of the document, the length of the title of the document, and/or the length of the text of source anchors for links pointing to the document.

The ranking engine then ranks the responsive documents using the scores. For example, the responsive documents are ranked based on the scores. In some implementations information pertaining to one or more of the responsive documents, the scores of the one or more responsive documents, and/or the rankings of the one or more responsive documents may be provided to query to entity association system 120 for use in associating queries with one or more entities and/or the entity to query association system 140 for use in associating a query with one or more entity search queries. The search system 115 uses the documents identified and scored by the ranking engine to generate results. The results include results corresponding to documents responsive the query. For example, results can include titles of each of the documents, links to each of the documents, and/or a summary of content from each of the documents that is responsive to the query. For example, the summary of content may include a particular "snippet" or section of one or more documents that is responsive to the query.

Other examples of results include a summary of information responsive to the query. The summary can be generated from documents responsive to the query and/or from other sources. For example, in some implementations the summary can be generated based on identification of one or more entities associated with a submitted query. For example, in some implementations the search system 115 may identify an entity associated with a query via query to entity association database 125. In response to the query, results may be provided that include a summary of the entity. For example, the entity and/or one or more properties of the entity may be provided as a result. Also, for example, in some implementations the search system 115 may identify an entity search query for the entity via entity to query association database 145. The identified entity search query for the entity may be displayed in combination the search results as an alternative query suggestion and/or associated with the entity summary to enable searching based on the identified entity search query (e.g., via selecting a "see results about the entity" link in the entity summary).

The results are transmitted to the client device 130 in a form that may be provided to the user. For example, the results 130 may be transmitted as a search results web page to be displayed on a browser running on the client device and/or as one or more search results conveyed to a user via audio.

The one or more applications executing on the computing device 130 may additionally and/or alternatively provide partial queries being formulated by users, before the users have indicated completion of the queries. The applications may be, for example, a web browser, a toolbar running in a web browser, an e-mail application, a text-messaging application, and/or a search client running on the computing device 130. In some implementations the applications provide each character of a query as it is typed or otherwise entered by the user. In some implementations the applications provide multiple characters at a time, optionally following a pause by the user between character entries.

A partial query is a query formulated by a user prior to an indication by the user that the query is a completed query. In some implementations a user may indicate a completed query by entering a carriage return and/or other character. In some implementations a user may indicate a completed query by selecting a search button or other submission button in a user interface presented to the user. In some implementations a user may indicate a completed query by speaking a command in a speech user interface. In some implementations a user may indicate a completed query by pausing more than a predetermined amount of time during entering of the query. Other forms of providing a partial query and/or indicating a completed query may additionally and/or alternatively be utilized.

In response to a partial query entered by a user, the computing device 130 may facilitate entry of user input by providing suggested inputs to the user. For example, when the user enters one or more characters, the computing device 130 can provide autocomplete query suggestions that are selected using the one or more characters. In some implementations the autocomplete query suggestions may be provided to the computing device 130 by query suggestion system 135. The autocomplete query suggestions that are provided may include words or phrases that include the one or more characters that were entered by the user. For example, complete words or extended phrases can be suggested for partial words or partial phrases that a user has entered (e.g., using a physical or virtual keyboard). The autocomplete query suggestions can also include words or phrases that are similar to (e.g., synonyms or spelling corrections of) the user input. The user can interact with (e.g., tap, click, or otherwise affirmatively select) one of the provided autocomplete query suggestions to select the autocomplete query suggestion.

In some implementations, the computing device 130 does not initiate a search using the query in response to a selection of an autocomplete query suggestion. Rather, the computing device 130 can wait to initiate a search until query completion data is received. The query completion data can indicate that the user has finished composing a complete query. The query completion data can be received as an interaction with a user interface element that occurs separate from the selection of an autocomplete query suggestion.

Figure 6:
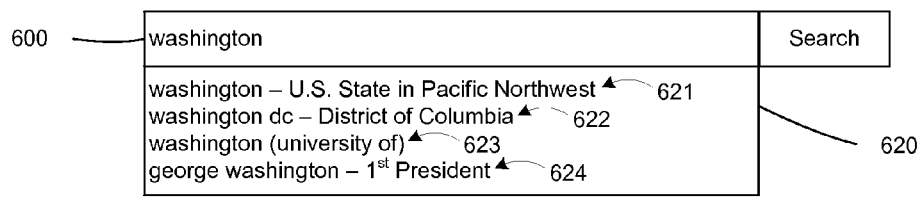
FIG. 6 illustrates an example graphical user interface for displaying a query suggestion that includes an entity descriptor.

The autocomplete query suggestions may be displayed to a user in a user interface of the computing device 130. For example, the autocomplete query suggestions may be displayed as illustrated in FIG. 6 within a cascaded drop down menu of the search field of an application, such as a web browser executing on the computing device 130, as the user is typing the query. Also, for example, the autocomplete query suggestions may be displayed in a plurality of separately selectable cells arranged in one or more rows or columns in a user interface as the user is typing the query. In some implementations one or more search results for a query suggestion may also optionally be displayed as the user is typing the query.

In some implementations, in response to a partial query being entered at computing device 130, the search system 115 receives the partial query and forwards the partial query to the query suggestion system 135. In some implementations, in response to a partial query being entered at computing device 130, the one or more applications executing on the computing device 130 may optionally directly forward the partial query to the query suggestion system 135. For example, in some implementations the browser 132 may directly forward the partial query to the query suggestion system 135. The query suggestion system 135 includes memory for storage of data and software applications, a processor for accessing data and executing applications, and components that facilitate communication over the communication network 101. The query suggestion system 135 may then match the submitted partial query to one or more of a plurality of autocomplete query suggestions that are an appropriate match to the partial query. In some implementations the autocomplete query suggestions may represent potential completed queries that may be provided to a user to enable the user to choose one of the autocomplete query suggestions as a basis for utilization in a search or other information retrieval application.

As discussed herein, in some implementations one or more of the provided autocomplete query suggestions may be determined via the query to entity association system 120, the query to entity association database 125, and/or the entity to query association system 140. For example, in some implementations one or more of the autocomplete query suggestions may include an entity descriptor that is based on an identified entity associated with the query and/or a query suggestion for the query. For example, each of the autocomplete query suggestions for the partial query "washington" in FIG. 6 is provided with an entity descriptor. The entity descriptor may be based on identification of one or more entities associated with the autocomplete query suggestion as determined via query and entity suggestions system 120 and/or query to entity association database 125. In some implementations the autocomplete query suggestions may include those determined based on a list of past user queries, a list of automatically generated queries, and/or real time automatically generated queries. For example, the query suggestion system 135 may use prefix based matching to identify query suggestions from a list of past user queries. Any listing of past user queries and/or past automatically generated queries may optionally be stored in an autocomplete query suggestion content database, for potential utilization as query suggestions and/or as a basis for query suggestions. Any entity annotations of the autocomplete query suggestions may also optionally be stored and/or determined via query to entity association system 120 and/or query to entity association database 125.

In some implementations the autocomplete query suggestions may include an entity descriptor that identifies a particular entity associated with the autocomplete query suggestion. In some implementations the entity descriptor may be included in a search query submitted in response to selection of the autocomplete suggestion. In some implementations the submitted search query may omit the entity descriptor. In some implementations the provided autocomplete query suggestion and the query submitted in response to user selection of the autocomplete query suggestion may differ. For example, in some implementations a provided autocomplete query suggestion may be identified via query to entity association database 125 and the actual query submitted in response to selection of the provided autocomplete query suggestions may be identified via entity to query association database 145.

In some implementations any provided autocomplete query suggestion content database may include one or more autocomplete query suggestions that have been determined, scored, and/or sorted according to one or more methods and/or apparatus described herein. For example, the autocomplete query suggestion content database may include one or more autocomplete query suggestions that have been determined, scored, and/or sorted based on one or more entities associated with the autocomplete query suggestion and/or one or more entities responsive to a partial query for which the autocomplete query suggestion is responsive. For example, for the partial query "sting" autocomplete query suggestions of "sting wrestler" and/or "sting musician" may be determined, scored, and/or sorted based on identification of association between the query "sting" and entities for the wrestler Sting and the musician Sting. Also, for example, for the partial query "stin" (no "g") autocomplete query suggestions of "sting wrestler" and/or "sting musician" may be determined, scored, annotated and/or sorted based on identification of association between an autocomplete suggestion of "sting" (suggestion for "stin") and entities for the wrestler Sting and the musician Sting.

Also, for example, the autocomplete query suggestion content database may include an actual query submission associated with each of one or more of the autocomplete suggestions that have been determined, scored, and/or sorted based on the entity associated with the autocomplete suggestion. For example, the actual query submission associated with the autocomplete query suggestion "sting musician" may be determined, scored, and/or sorted based on identification of association between the query "sting" and entities for the wrestler Sting and the musician Sting. Also, for example, for the partial query "stin" (no "g") autocomplete query suggestions of "sting wrestler" and/or "sting musician" may be determined, scored, annotated and/or sorted based on identification of association between an autocomplete suggestion of "sting" (suggestion for "stin") and entities for the wrestler Sting and the musician Sting.

Such autocomplete query suggestions may be provided to a user. In some implementations the query suggestion system 135 may provide the autocomplete query suggestions to a user via the search system 115, the entity to query association system 140, the query to entity association system 120, and/or to the computing device 130 directly.

In some implementations the query suggestion system 135 may transmit the determined additional autocomplete query suggestions, determined scores for one or more of the autocomplete query suggestions, a query associated with one or more of the autocomplete suggestions, and/or the ranking of the autocomplete query suggestions for storage in a database. In some implementations stored data may optionally be associated with a corresponding query in the database for future retrieval in response to a future autocomplete query suggestion request for the query. In some implementations the query suggestion system 135 may identify existing autocomplete query suggestions for a given partial query to enable determination of additional autocomplete query suggestions and/or annotations for storage in a database for future retrieval. In some implementations the query suggestion system 135 may supply autocomplete query suggestions associated with an entity and/or one or more queries associated with the autocomplete suggestions for a real time query.

In some implementations the query suggestion system 135 provides autocomplete query suggestions to a user. In some implementations the query suggestion system 135 may provide the autocomplete query suggestions to a user via the search system 115, the query suggestion system 135, and/or to the computing device 130 directly.

In some implementations the search system 115 and/or the computing device 130 may optionally additionally or alternatively provide a completed query to the query suggestion system 135. A completed query is a query that the user has indicated is complete. The autocomplete query suggestion engine 110 may then match the completed query to one or more autocomplete query suggestions to determine one or more query suggestions for the user's completed query. The query suggestion system 135 then provides these query suggestions to the user. The query suggestions may, for example, be embedded within a search results web page to be displayed in an application, such as the web browser 132, as potential further search options.

The communication network 101 facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques.

Many other configurations are possible having more or less components than the environment shown in FIG. 1. For example, although the query to entity association system 120, the entity to query association system 140, and the search system 115 are each illustrated alone in FIG. 1, it is understood that one or more aspects of two or more of the systems may optionally be combined with one another and/or with aspects of one or more of the other components in some implementations. Also, for example, in some implementations one or more components may be omitted such as query suggestion system 135, query to entity association system 120, query to entity association database 125, and/or entity properties database 105.

Figure 2A:
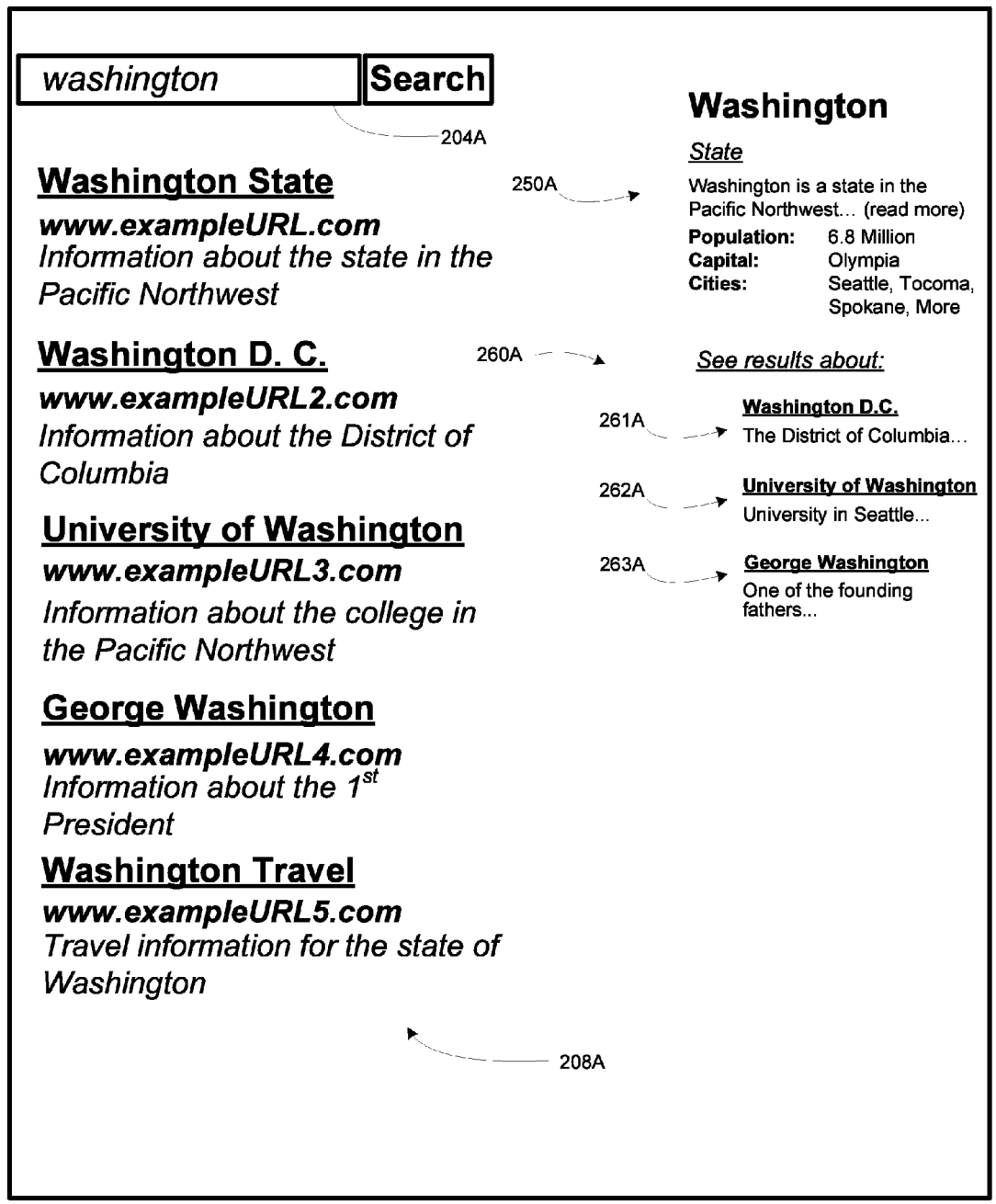
FIGS. 2A and 2B illustrate example graphical user interfaces for displaying search results in response to a query; the search results include entity summaries that may be selected by a user to obtain search results specific to an entity.
Figure 2B:
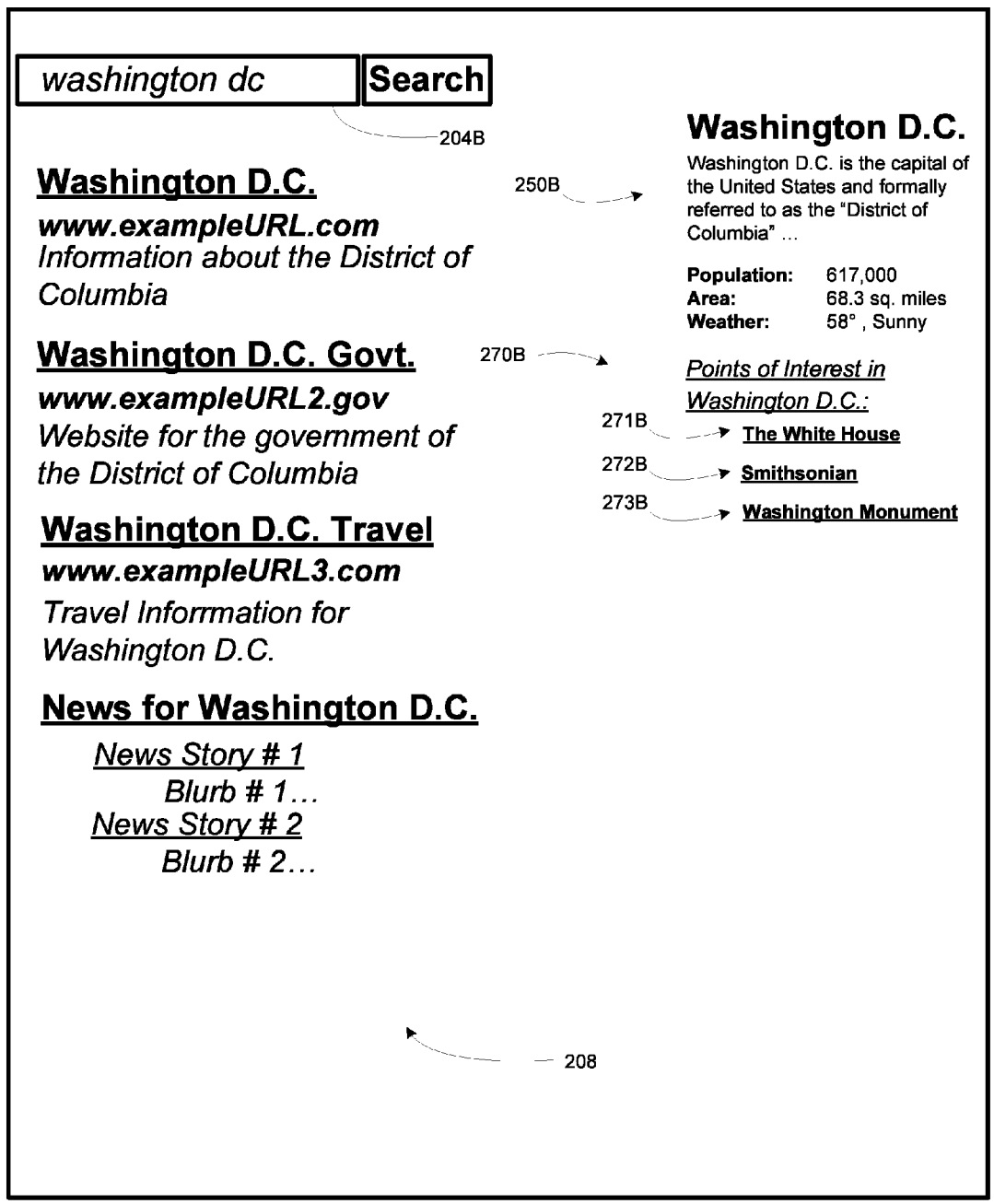

FIGS. 2A and 2B illustrate example graphical user interfaces for displaying search results in response to a query. The illustrated graphical user interfaces include one or more entity summaries incorporated therewith. The entity summaries include one or more properties of an entity associated with the respective queries. As discussed herein, the properties may be obtained, for example, from the entity properties database 105 and/or the query to entity association database 125. The entity summaries and/or the properties displayed with the entity summaries may optionally be ranked utilizing one or more signals related to the entities, related to the query and/or related to one or more documents responsive to the query. Signals can include, for example, one or more signals such as those described with respect to FIG. 1. Any optionally determined rankings may be utilized to determine which entities are provided in an entity summary, an order of multiple entity summaries, which properties of an entity are provided in an entity summary, and/or an order of multiple properties in an entity summary.

In FIG. 2A the query "washington" 204A is submitted to a search engine, through the graphical user interface, and a set of search results that are responsive to the query 204A are generated by the search engine and presented in the user interface. The search results in FIG. 2A include search results 208A that are based on search result documents responsive to the query. The search results 208A may be ranked according to one or more signals as discussed herein such as document based signals and/or query based signals. The search results in FIG. 2A also include an expanded entity summary 250A for the state of Washington and non-expanded entity summaries 260A. The non-expanded entity summaries include summaries for the entities "Washington D.C." 261A, the "University of Washington" 262A, and "George Washington" 263A. The expanded entity summary 250A includes more information than each of the entity summaries 260A. The entity summary 250A and/or the entity summaries 261A, 261B, and/or 261C may optionally be selected (e.g., via clicking or hovering over) to navigate to additional information about the respective entity, to provide a more detailed entity summary on the search results page of FIG. 2A (e.g., effectively "expanding" the selected entity summary), and/or to obtain search results that are more focused toward the selected entity (e.g., via issuing a new search specific to that entity and/or filtering the existing search results).

For example, selecting the entity summary 250A may issue a new search for the entity associated with "washington state" and search results responsive to that query may be provided. In some implementations the new search issued for the entity associated with "washington state" may be based on an entity search query identified via the entity to query association database 145. For example, the entity associated with "washington state" may be mapped to an entity search query in entity to query association database 145 that provides desired search results to a user that are responsive to that entity. For example, the entity associated with "washington state" may be mapped to the entity search query "state of washington" in the entity to query association database 145.

Although specific entity summaries 250A and 260A are illustrated in FIG. 2A, it is understood that additional and/or alternative properties related to an entity may be provided. For example, in some implementations one or more images of an entity and/or related to an entity may be provided in an entity summary. Also, for example, in some implementations an entity search query for an entity that is associated with the entity in the entity to query association database 145 may be displayed in the entity summary. For example, the entity summary associated with the entity "washington state" may be mapped to the query "state of washington" in the entity to query association database and the text of "state of washington" may be provided in the entity summary as a search that may be issued to obtain search results relevant to the entity "washington state".

The entities associated with the entity summaries 250A and 260A may be identified based on association of the query 204A with the entities of the entity summaries 250A and 260A. The association may be determined via query to entity association system 120 and/or query to entity association database 125. In some implementations the entity summaries 250A and 260A may be presented based on a ranking of the respective entities for the query 204A in the query to entity association database 125. For example, the state of Washington may be the highest ranked entity followed in order by "Washington D.C.", "University of Washington", then "George Washington." In some implementations the expanded entity summary 250A may be expanded based on it being based on the highest ranked entity. In some implementations the expanded entity summary may be expanded based on satisfaction of a threshold relative to the ranking of a second highest ranked entity such as the entity associated with "Washington D.C.".

In some implementations any score and/or ranking associated with the entities of the entity summaries 250A and 260A may be based on scores associated with the entities by query to entity association system 120 and/or in query to entity association database 125. In some implementations the ranking of the entities may be adjusted and/or determined based on the search result documents associated with search results 208A and/or additional search result documents responsive to the query. For example, in some implementations the entity Washington State may be associated with a score for the query "Washington" in the query to entity association database 125 and the score may be adjusted based on the results 208A. For example, the score may be boosted based on the top ranked search result of the search results 208A being about Washington State and an additional displayed search result (the last displayed search result) also being about Washington State. Ranking of the entities based at least in part on the search results 208A may enable ranking of the entities based on search results that are personalized to the user (e.g., based on user data) and/or to enable ranking of the entities based on fresh search results (e.g., to account for promotion and/or demotion of search results since any prior ranking was determined).

In FIG. 2B the query "washington dc" 204B is submitted to a search engine, through the graphical user interface, and a set of search results that are responsive to the query 204B are generated by the search engine and presented in the user interface. The search results in FIG. 2B include search results 208B that are based on search result documents responsive to the query 204B. The search results 208B may be ranked according to one or more signals as discussed herein such as document centric signals and/or query centric signals. The search results in FIG. 2B also include an entity summary 250B for "Washington D.C."

The entity summary 250B includes a points of interest listing 270B in which additional properties associated with Washington D.C. are listed. The listed properties include additional entities that are associated with Washington D.C. (e.g., mapped to Washington D.C. in the entity properties database 105). The related entities include "The White House" 271B, "Smithsonian" 272B, and "Washington Monument" 273B. In some implementations the related entities may be selected and/or ordered based on a ranking associated with the related entities. For example, the White House may be the highest ranked entity followed in order by the Smithsonian then the Washington Monument. In some implementations the ranking for properties for an entity, such as related entities, may be based on a relationship between the property and the query and/or a relationship between the property and the search result documents associated with the entity.

For example, in some implementations the points of interest listing 270B may be determined based on satisfaction of a threshold. For example, in some implementations where the ranking is based on a score associated with the properties and a higher score is associated with a higher ranking, the threshold may be satisfied if the score of the property exceeds the score of a threshold value. Although a specific entity summary 250B and points of interest listing 270B are illustrated in FIG. 2B, it is understood that additional and/or alternative properties related to an entity may be provided. For example, in some implementations one or more images of and/or related to an entity and/or one or more related entities may be provided in an entity summary.

The entity summary 250B may be identified based on association of the query 204B with the entity of the entity summary 250B. The association may be determined via query to entity association system 120 and/or query to entity association database 125. In some implementations the entity summary 250B may be presented based on a ranking of the one or more entities for the query 204B.

In some implementations any score and/or ranking associated with the entity of the entity summary 250B and/or the points of interest listing 270B associated with the entity summary 250B and 260A may be based on scores associated with the entities and/or the points of interest by query to entity association system 120 and/or in query to entity association database 125. In some implementations the ranking may be adjusted and/or determined based on the search results 208B and/or additional search results that are based on search result documents responsive to the query. Ranking of the entities and/or the points of interest for one or more given entities based on the search results 208B may enable ranking of the entities based on search results that are personalized to the user (e.g., based on user data) and/or to enable ranking of the entities based on fresh search results (e.g., to account for promotion and/or demotion of search results since any prior ranking was determined).

In some implementations the related entities "The White House" 271B, "Smithsonian" 272B, and/or "Washington Monument" 273B may be selected (e.g., via a user interface) to obtain search results that are more focused toward the selected entity to issue a new search specific to that entity. For example, selecting the entity 271B may issue a new search for the entity associated with "The White House" and search results responsive to that query may be provided. In some implementations the new search issued for the entity associated with "The White House" may be based on a query identified via the entity to query association database 145. For example, the entity associated with "The White House" may be mapped to a query in entity to query association database 145 that provides desired search results to a user that are responsive to that entity. For example, the entity associated with "The White House" may be mapped to the query "The White House Washington DC" in the entity to query association database.

While FIGS. 2A-2B show example visual displays of search results, presenting search results can include various forms of presentation including, for example, displaying search results on a display device, transmitting search results to a user's computer for presentation to the user, transmitting search results to another device, transmitting sounds corresponding to the search results, providing haptic feedback corresponding to the search results, and/or transmitting signals comprising haptic feedback corresponding to the search results to a user's computer for presentation to the user.

Figure 3:
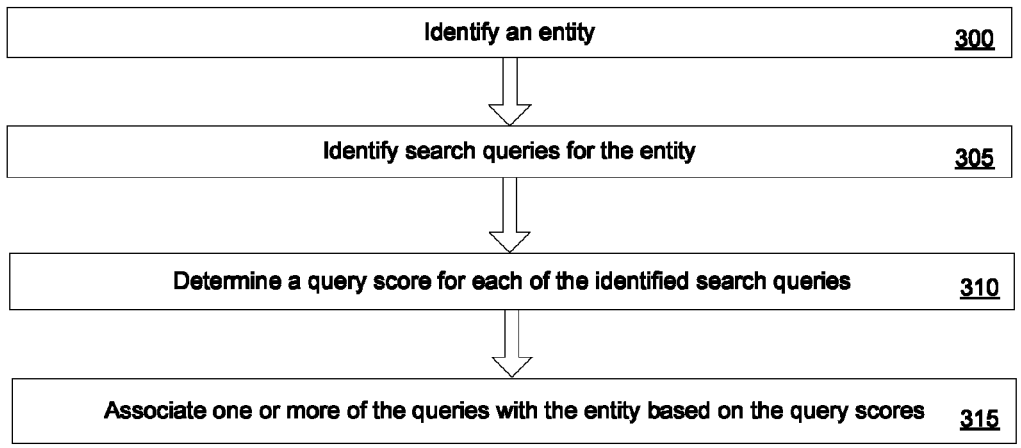
FIG. 3 is a flow chart illustrating an example method of associating an entity with at least one entity search query.

FIG. 3 is a flow chart illustrating an example method of associating an entity with at least one entity search query. Other implementations may perform the steps in a different order, omit certain steps, and/or perform different and/or additional steps than those illustrated in FIG. 3. For convenience, aspects of FIG. 3 will be described with reference to a system of one or more computers that perform the process. The system may include, for example, the entity to query association system 140 and/or the search system 115 of FIG. 1.

At step 300, an entity is identified. In some implementations the entity may be identified from the query to entity association database 125. In some implementations the entity may be identified from another source such as entity properties database 105. In some implementations the query to entity association database 125 may, for each of one or more queries, only contain a single entity associated therewith. In some implementations the single entity associated with a given query may be the dominant entity associated with the query. For example, for each query a single entity may be associated with the query that is the highest ranking entity for that query based on one or more signals such as, for example an entity score for the given entity for the given query. In some implementations the query to entity association database 125 may contain a mapping of one or more queries that each have multiple entities associated therewith and the entity to query association system 140 may reduce the mapping by associating, for each query, only a single dominant entity therewith. For example, the query to entity association database 125 may contain a mapping of one or more queries that each have multiple ranked entities associated therewith and the entity to query association system 140 may generate a reduced mapping that only includes queries with each query mapped to a single highest ranked entity associated therewith. In some implementations the entity may be identified from entities of such a reduced mapping.

At step 305, search queries are identified for the entity received at step 300. In some implementations the entity to query association system 140 may identify the search queries based on a mapping of queries to entities such as query to entity association database 125 and/or a reduced mapping of query to entity association database 125 as describe above with respect to step 300. In some implementations the entity to query association system 140 may invert the mapping of queries to entities to obtain a mapping of entities to queries. A plurality of the entities in the inverted mapping will each have multiple queries associated with the entity. In some implementations all of the search queries associated with the entity received at step 300 are identified. In some implementations less than all of the search queries are identified for the entity received at step 300. For example, some thresholding may be utilized to omit certain queries based on one or more signals related to the queries. For example, queries may be omitted if they fail to satisfy a threshold popularity measure.

At step 310, a query score for each of the identified search queries is identified. In some implementations the query score for a given search query for the entity may be based on one or more of entity ambiguity of the query, popularity of the search query, and search result document quality for the search result documents responsive to the query that are associated with the entity.

The entity ambiguity of a given query for the identified entity at step 300 may be indicative of how related the query is to the identified entity. In implementations where a higher query score is more indicative of association between an entity and a query, the more related a given query is to the identified entity, the higher the query score for the given entity will be. In some implementations the entity ambiguity may be based on the query to entity association database 125. For example, in some implementations the query to entity association database 125 may contain an entity ambiguity measure for one or more entity of one or more of the queries identified at step 310. For example, an entity score for the entity identified at step 300 may be identified for a given query of the queries identified at step 305 and utilized to determine the entity ambiguity of the query.

Also, for example, for a given query of the queries identified at step 305, one or more other entities and/or entity scores of other entities mapped to the given query in the query to entity database 125 may be utilized to determine entity ambiguity of the query for the identified entity. For example, for a given query an entity score for the entity identified at step 300 may be identified for the given query and compared to one or more entity scores of other entities mapped to the given query in the query to entity to determine entity ambiguity of the query for the given entity. For example, assuming a difference between the entity score of the entity identified at step 300 and the next highest scored entity may be determined and utilized to determine entity ambiguity of the query for the identified entity. For example, assuming entity scores from 0 to 1, with 1 being most indicative of relation of the query to the entity, a score of 0.6 for the entity identified at step 300 and an entity score of 0.1 for the next highest scored entity would be indicative of less entity ambiguity for the identified entity than if the entity score for the next highest ranked entity was 0.4. In some implementations entity scores for one or more of the entities associated with the query may be determined by entity to query association system 140. For example, the entity to query association system may perform one or more steps of the method of FIG. 7, such as those described with respect to step 720, in determining an entity score.

Also, for example, for a given query for the entity identified at step 300 a number of additional entities also associated with the query may be identified to determine entity ambiguity of the query for the identified entity. For example, the query may be identified as being more related to the entity if only one additional entity is associated with the query than if five additional entities were associated with the query. Also, for example, the query may be identified as being more related to the identified entity if only one additional entity having an entity score above a threshold is associated with the query than if five additional entities having the entity score above the threshold are associated with the query. In some implementations entity ambiguity of the query for an identified entity may be based on both a number of additional entities also associated with the query and entity scores of other entities mapped to the given query.

In some implementations the entity ambiguity for a given query for an entity identified at step 300 may additionally and/or alternatively be based on a relationship between the identified entity and search result documents associated with the query. For example, in some implementations the entity to query association system 140 may identify which of a set of the search result documents responsive to the query are associated with the identified entity and/or primarily associated with the identified entity. For example, if 80% of the top 20 search result documents responsive to the query are primarily associated with the identified entity, the query may be identified as being more related to the entity than if only 50% of the top 20 search result documents responsive to the query are primarily associated with the identified entity. Also, for example, if 80% of the top 20 search result documents responsive to the query associate the entity as one of the top two entities in the documents, the query may be identified as being more related to the identified entity than if only 50% of the top 20 search result documents responsive to the query as one of the top two entities in the documents.

In some implementations the entity to query association system 140 may identify whether an entity is associated with a search result document based on a database of documents and associated entities such as document and entity association database 110. For example, for each of the identified search result documents, the document and entity association database 110 may be consulted to identify one or more entities associated with the document. In some implementations an association between a document and an entity may be based on presence of one or more properties of the entity in the document. For example, an association between a document and an entity may be based on an importance of one or more alias of the entity in the document. For example, appearance of an alias of an entity in important fields and/or with great frequency in a document may be indicative of association of the entity to the document. Also, for example, an association between a document and an entity may be based on presence of additional and/or alternative properties of an entity such as date of birth, place of birth, height, weight, population, geographic location(s), type of entity (e.g., person, actor, location, business, university), etc. In some implementations an entity to document ranking for each of multiple entities associated with a search result document may also be identified. For example, in some implementations the document and entity association database 110 may include a ranking and/or score of the entities associated with a given document. For example, the document and entity association database 110 may identify the ranking of each of a plurality of relative entities to one another in a given document.

In some implementations the entity to query association system 140 may identify an association between the identified entity and the search result documents associated with the entity without accessing a database of documents and associated entities. For example, in some implementations an entity to document association and/or entity to document ranking may be determined by the entity to query association system 140 and based on frequency of appearance, location of appearance, and/or formatting applied to one or more occurrences of the entity in the document; frequency of appearance, location of appearance, and/or formatting applied to one or more properties of the entity in the document; and/or other factors. Additional and/or alternative factors may be considered in determining entity ambiguity of a given query for the identified entity.

The popularity of a given search query may be indicative of a frequency of submission of the search query. In implementations where a higher query score is more indicative of association between an entity and a query, the more popular a given query is, the higher the query score for the given entity will be. In some implementations the popularity of a given query may be based on a query popularity database that associates each of a plurality of queries with a corresponding popularity score. In some implementations the popularity of a given query may be based on frequency of the given query in one or more search logs. Additional and/or alternative factors may be considered in determining the popularity of the query.

The search result document quality for the search result documents responsive to the query that are associated with the identified entity may be indicative of the quality of one or more of the search results that are associated with the identified entity. In implementations where a higher query score is more indicative of association between an entity and a query, the higher the search result document quality for the search result documents is, the higher the query score for the given entity will be. As discussed herein, association between a search result document and a given entity may be based on, for example, a document to entity database and/or determination by entity to query association system 140. The search result document quality for a given search result may be based on one or more ranking signals such as one or more ranking signals described herein with respect to search system 115. For example, the search result document quality for the search result documents responsive to the query may be based on the number of users that navigate to the search result documents when they are presented as search results. In some implementations the search system 115 may provide the ranking signals.

In some implementations the search result document quality is determined for those search result documents that are primarily associated with the identified entity (e.g., as identified via document and entity association database 110). In some implementations the search result document quality is determined for those search result documents wherein the identified entity is one of the top X ranked entities associated with the document, wherein X is an integer. In some implementations the search result document quality may be determined for all search result documents that are responsive to the query and associated with the identified entity. In some implementations the search result document quality may be determined for a subset of the search result documents that are responsive to the query and associated with the entity (e.g., those of the first 20 search result documents responsive to the query and identified with the entity). Additional and/or alternative factors may be considered in determining search result document quality of the query.

In some implementations the search result document quality may be determined by summing individual search result document quality scores for each of those search result documents that are associated with the identified entity. In some implementations the search result document quality may be determined by averaging the individual search result document quality scores for each of those search result documents that are associated with the entity. Additional and/or alternative methods may be utilized in determining the search result document quality.

In some implementations the query score for a given search query for the entity identified at step 300 may additionally be based on a similarity measure between the given search query and the identified entity. In implementations where a higher query score is more indicative of association between an entity and a query, the more similar a given query is to the entity, the higher the query score for the given entity will be. For example, in some implementations the query score for a given search query for the identified entity may be based on similarity between a trusted alias of the identified entity and the search query. For example, the similarity measure may be based on the edit distance between the trusted alias of the identified entity and the search query.

The query score for a given search query for the identified entity may be based on a combination of one or more of the entity ambiguity of the query, the popularity of the search query, the search result document quality for the search result documents responsive to the query that are associated with the identified entity, and the similarity measure between the given search query and the identified entity.

In some implementations the weighting of one or more of the entity ambiguity of the query, the popularity of the search query, the search result document quality for the search result documents responsive to the query that are associated with the identified entity, and the similarity measure between the given search query and the identified entity in determining the query score may be based on an intended application of the query to be associated with the entity.

For example, if the query is going to be displayed to a user, then the similarity measure between the given search query and the identified entity may be weighted more heavily relative to one or more other factors to identify a query that a user is likely to associate with the given entity when the query is displayed. Also, for example, if the query is going to be displayed to a user, then the popularity of the search query may be weighted more heavily relative to one or more other factors to identify a query that may look more natural to a user based on multiple users having selected the query in the past.

Also, for example, if search results based on the query are going to be displayed to a user, then the search result document quality for the search result documents responsive to the query may be weighted more heavily relative to one or more other factors to identify a query that is likely to provide popular search results for the identified entity to the user.

Also, for example, if the query is going to be utilized to mine facts about the identified entity, then the entity ambiguity may be weighted more heavily relative to one or more other factors to identify a query that is likely to provide search results that are primarily about the identified entity.

At step 315 one or more of the search queries identified at step 305 is associated with the entity identified at step 300 based on the query scores identified at step 310. For example, for each of the search queries identified at step 305, a query score may be determined at step 310, and the query associated with the highest query score associated with the entity identified at step 300. Also, for example, for each of the search queries identified at step 305, a query score may be determined at step 310 for each of multiple intended applications, and the query associated with the highest query score for a first intended application may be associated with the entity identified at step 300 for the first intended application and the query associated with the highest query score for the second intended application may be associated with the entity identified at step 300 for the second intended application. For example, a given entity may be associated with a first query for a first intended application where the query will be displayed to a user, may be associated with a second query for a second intended application where search results based on the query will be displayed to a user, and/or may be associated with a third intended application where the query is going to be utilized to mine facts about the identified entity. In some implementations the association between one or more of the search queries identified at step 305 is associated with the entity identified at step 300 and stored in a database such as entity to query association database 145.

Figure 4:
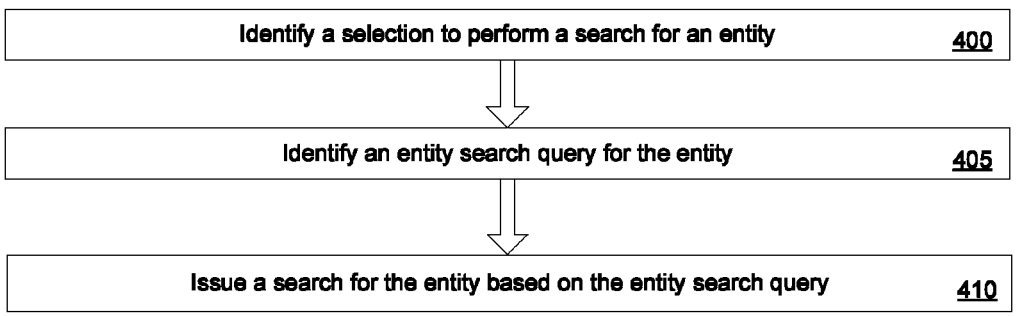
FIG. 4 is a flow chart illustrating an example method of identifying an entity search query for a user selected entity and issuing a search based on the entity search query.

FIG. 4 is a flow chart illustrating an example method of identifying an entity search query for a user selected entity and issuing a search based on the entity search query. Other implementations may perform the steps in a different order, omit certain steps, and/or perform different and/or additional steps than those illustrated in FIG. 4. For convenience, aspects of FIG. 4 will be described with reference to a system of one or more computers that perform the process. The system may include, for example, the search system 115 and/or the entity to query association system 140 of FIG. 1.

At step 400, a selection to perform a search for an entity is identified. In some implementations the query may be a query submitted by a user. In some implementations the selection may be received in response to a user requesting additional search results about a particular entity. For example, in some implementations the user selection may be received in response to a user requesting additional search results about an entity displayed in an entity summary, such as one or more of the entity summaries of FIGS. 2A and 2B. In some implementations the search system 115 and/or the entity to query association system 140 may receive the query. In some implementations the query may be a query submitted by another component, such as a fact mining system. In some implementations an intended application of the search for the entity may also be identified. For example, in some implementations an intended application of the search for the entity may be based on a source of the selection to perform the search of for the entity and/or may be explicitly indicated in a received search.

At step 405, an entity search query for the entity is identified. In some implementations the entity search query may be identified from entity to query association database 145. In some implementations the entity search query may be identified via entity to query association system 140 performing one or more steps of the method of FIG. 3 such as steps 300-315. In some implementations the entity search query may be identified based on any intended application of the search for the entity optionally identified at step 400. For example, the identified entity search query may be a first search query for a first intended application and a second search query for a second intended application. In some implementations step 405 may be performed before step 400. For example, in some implementations an entity search query may be identified for an entity of the given entity summary prior to selection to perform a search for the entity via the entity summary. For example, an "obtain additional search results related to entity" link of the entity summary may be associated with the entity search query via step 405 and user selection to perform the search via step 400 may include selecting the link of the entity summary.

At step 410, a search is issued for the entity based on the entity search query. For example, the entity search query may be submitted to the search system 115. In some implementations the entity to query association system 140 may submit the entity search query to the search system 115.

Figure 5:
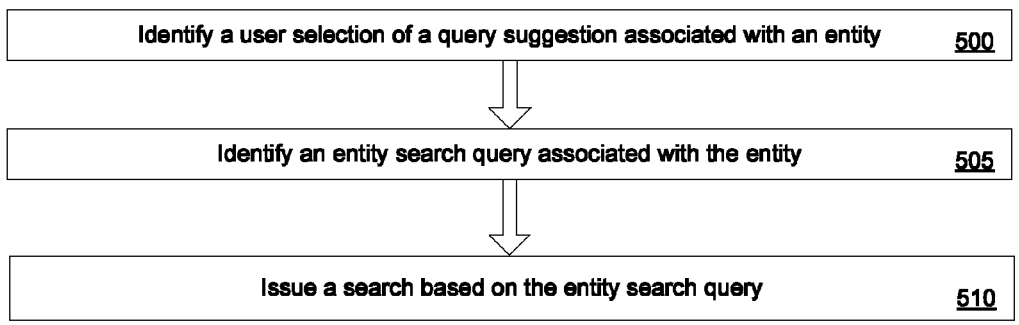
FIG. 5 is a flow chart illustrating an example method of identifying an entity search query for a user selected query suggestion associated with an entity and issuing a search based on the entity search query.

FIG. 5 is a flow chart illustrating an example method of identifying an entity search query for a user selected entity and issuing a search based on the entity search query. For convenience, aspects of FIG. 5 will be described with reference to a system of one or more computers that perform the process. The system may include, for example, the query suggestion system 135 and/or the entity to query association system 120 of FIG. 1.

At step 500 a user selection of a query suggestion associated with an entity is identified. For example, with reference to FIG. 6, the query "washington" may be received in the search field 600 and multiple query suggestions provided in a cascaded drop down menu 620, with one or more of the query suggestions being associated with an entity. The query suggestions include: a first query suggestion of "Washington—U.S. State in Pacific Northwest" that is associated with a first entity and includes the descriptor "U.S. State in Pacific Northwest" 621; a second query suggestion of "Washington dc—District of Columbia" that is associated with a second entity and includes the descriptor "District of Columbia" 622; a third query suggestion of "Washington (university of)" that is associated with a third entity includes the descriptor "university of" 623; and a fourth query suggestion of "George Washington—1$^{st}$ President" that is associated with a fourth entity and includes the descriptor "1$^{st}$ President" 624. At step 500, a user selection of one of those query suggestions associated with an entity may be identified. In some implementations step 505 may be performed before step 500. For example, in some implementations an entity search query may be identified for a given query suggestion associated with a single entity prior to presenting the query suggestion to the user. For example, in some implementations query suggestion system 135 may identify a query suggestion that is primarily associated with a given entity (e.g., via an entity annotation and/or via consultation of query to entity association database 125) and associate an entity search query with that query suggestion (e.g., via consultation of entity to query association database) prior to presenting the query suggestion to the user to enable user selection of the query suggestion. In some implementations step 500 and step 400 may share one or more aspects in common.

At step 505, an entity search query for the entity associated with the query suggestion is identified. In some implementations the entity search query may be identified from entity to query association database 145. In some implementations the entity search query may be identified via entity to query association system 140 performing one or more steps of the method of FIG. 3 such as steps 300-315. In some implementations the entity search query may be identified based on an intended presenting search results to a user application of the query. In some implementations step 505 and step 405 may share one or more aspects in common.

At step 510, a search is issued for the entity based on the entity search query. For example, the entity search query may be submitted to the search system 515. In some implementations the entity to query association system 540 may submit the entity search query to the search system 515. In some implementations step 510 and step 410 may share one or more aspects in common.

FIG. 6 illustrates an example graphical user interface for displaying a query suggestion that includes an entity descriptor. In FIG. 6 the entered query is "washington" and that query and autocomplete suggestions based on that query (washington dc, George washington) are annotated with descriptions of entities 621-624. In some implementations entities may be determined for one or more autocomplete suggestions for an entered query. For example, assume a user entered "washingt" in search field 600. At step 505 a plurality of entities may be identified based on the term "washingt" by identifying an autocomplete suggestion for that word such as "washington", then identifying entities associated with that autocomplete suggestion. The autocomplete suggestion "washington" may then be annotated with disambiguating information based on identification of the multiple entities. For example, entity descriptors may be provided with "washington" to create query suggestions of "washington, district of Columbia", "washington, state in Pacific Northwest." As discussed with respect to FIG. 5, user selection of one of the autocomplete suggestions from the drop down menu 620 may result in a search query being issued for the entity associated with the autocomplete query suggestion. The search query for the entity may be identified from entity to query association database 145 and may optionally be associated with the entity and/or query suggestion prior to storage in query association database 145.

Alternative formats of presenting query suggestions may be provided. For example, as discussed herein query suggestions for a submitted query may be provided in combination with search results for the submitted query.

Figure 7:
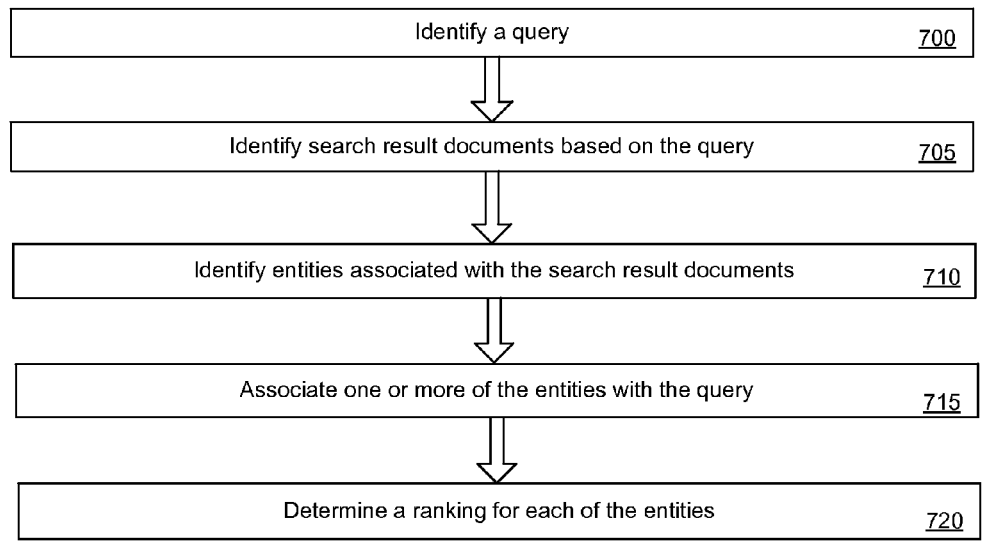
FIG. 7 illustrates a flow chart illustrating an example method of associating one or more entities with a query.

FIG. 7 is a flow chart illustrating an example method of associating one or more entities with a query. Other implementations may perform the steps in a different order, omit certain steps, and/or perform different and/or additional steps than those illustrated in FIG. 7. For convenience, aspects of FIG. 7 will be described with reference to a system of one or more computers that perform the process. The system may include, for example, the query to entity association system 120 and/or the search system 115 of FIG. 1.

At step 700, a query is identified. In some implementations the search system 115 may receive the query. In some implementations the query to entity association system 120 may receive the query. In some implementations the query may be a query submitted by a user. In some implementations the query may be a query from a log of queries, such as a log of past user queries and/or automatically generated queries.

At step 705, search result documents are identified based on the query received at step 700. For example, in some implementations the query to entity association system 120 may submit the query to the search system 115. The ranking engine of the search system 115 may use the index to identify documents responsive to the query. In some implementations all documents identified by the ranking engine of the search system 115 may be identified at step 705. In some implementations only a subset of documents identified by the ranking engine may be identified at step 705. For example, in some implementations only a certain percent of the total documents may be identified and/or only a certain number of documents may be identified. For example, in some implementations only a certain percent of the documents having the highest ranking may be identified. Ranking may be based on, for example, one or more signals described herein such as document based signals and/or query based signals.

At step 710, entities associated with each of the identified search result documents are identified. For example, in some implementations the query to entity association system 120 may identify the entities based on a database of documents and associated entities such as document and entity association database 110. For example, for each of the identified search result documents, the document and entity association database 110 may be consulted to identify one or more entities associated with the document. In some implementations an association between a document and an entity may be based on presence of one or more properties of the entity in the document.

One or more of the documents identified in step 700 may be associated with one or more entities. In some implementations some of the documents identified in step 700 may not be associated with any entities. In some implementations all entities associated with a document may be identified. In some implementations only a certain portion of the entities associated with a document may be identified. For example, in some implementations the entities associated with a document may be ranked and only one or more of the top ranked entities may be identified. In some implementations only those entities that satisfy an association threshold with the identified search result documents are identified. For example, in some implementations only those entities that are associated with a threshold number of the search result documents are identified. Also, for example, in some implementations only those entities that occur in at least a threshold percentage of search result documents are identified.

At step 715 one or more of the entities is associated with the query identified at step 700. In some implementations a given entity is associated with the query if it can be considered an interpretation of the query. Determination of whether a given entity is an interpretation of a query may be based on one or more properties of the entity. In some implementations the properties may be identified from one or more databases such as entity properties database 105.

In some implementations a given entity may be determined to be associated with the query if it can be considered to satisfy one or more conditions. For example, a given entity may be determined to be associated with the query if it can be considered to satisfy one or more of the following conditions:
  a. The query exactly matches one trusted alias of the entity (e.g., query "sting" matches a trusted name for the entity associated with Steven Borden).
  b. The query contains only one trusted alias of the entity and additional terms from a list of stop terms and/or stop phrases (e.g., "who is", "the", "an").
  c. The query contains only a trusted alias of the entity and a suffix that represents a property of the entity such as a "type" of the entity (e.g., "sting wrestler", "sting musician", or "washington state").
  d. The query contains one trusted alias of the entity and additionally, one of the top search result documents for the query is a reference page for that entity. Top search results may include, for example, the top X search results, the first page of search results, only the top search result, etc. The reference page for that entity may be a webpage that is referenced as a reference page for the entity in a database such as entity properties database 105. In some implementations the reference page for the entity may be a webpage in an online resource (e.g., one or more white listed resource websites) that is specifically directed toward that entity.
  e. The query contains only the name of two entities and/or stop terms or stop phrases, wherein one of the two entities is "implied" by the other entity. For example:
    i. The first entity is a location and the name of one of its containing locations is the second entity (e.g., "lake tahoe ca")
    ii. The first entity is a media piece such as a book and the second entity is a creator of the media piece such as an author (e.g., "da vinci code dan brown").
  In some implementations additional and/or alternative conditions may be utilized in determining whether a given entity is an interpretation of a query. In some implementations some stemming, spell correction, and/or other textual modification of a received query may be performed prior to determining whether a given entity is an interpretation of a query. For example, a received query of "da venci code dan brown" may be spell corrected to "da vinci code dan brown".

At step 720 a ranking is determined for each of the entities associated with the query at step 715. In some implementations the ranking is based on an entity score determined for each of the identified entities. In some implementations the entity score for a given entity is based on a relationship between the query identified at step 700 and the search result documents associated with the given entity. For example, the entity score for a given entity may be based on a query to document relevance scores for each of the one or more search result documents associated with the given entity. In some implementations the query to document relevance score for a given document may be based on one or more signals such as those described herein with respect to the search system 115. Each signal may provide information about the document itself and/or the relationship between the document and the query. One example signal for a document for a query is the fraction of clicks for that query going to that document. Another example signal is a measure of the overall quality of the document. In some implementations the query to document score may be identified by the search system 115.

The query to document relevance scores for each of the documents associated with the entity may be utilized in determining a score for the entity. For example, an entity $E_1$ may be associated with search result documents $D_1$, $D_2$, and $D_3$ and the entity score for entity $E_1$ may be based on scores related to relevance of the search result documents $D_1$, $D_2$, and $D_3$ to the query. For example, the entity score for entity $E_1$ may be based on summing the scores for the documents and/or averaging the scores for the documents.

In some implementations the entity score for an entity is additionally and/or alternatively based on a relationship between the entity and the search result documents associated with the entity. For example, in some implementations the query to entity association system 120 may identify a relationship between the entity and the search result documents associated with the entity based on a database of documents and associated entities such as document and entity association database 110. For example, for each of the identified documents, the document and entity association database 110 may be consulted to identify a ranking for one or more entities associated with the document. For example, the document and entity association database 110 may include entity to document relevance scores for each entity in each document. Each entity to document relevance score for a given entity in a given document may be indicative of the importance of the given entity in the given document.

In some implementations the query to entity association system 120 may identify a ranking between the entity and the search result documents associated with the entity without accessing a database of documents and associated entities. For example, in some implementations an entity to document relevance score may be determined by the query to entity association system 120 and based on frequency of appearance, location of appearance, and/or formatting applied to one or more occurrences of the entity in the document; frequency of appearance, location of appearance, and/or formatting applied to one or more properties of the entity in the document; and/or other factors.

Additional and/or alternative factors may be considered in determining an entity to document relevance score. For example, the query to entity association system 120 may obtain data that characterizes portions of the text of the documents as boilerplate content, (e.g., content that is reused in multiple resources). If the occurrence of the entity is in a portion of the text that has been characterized as boilerplate, the weight of the occurrence in that document can be decreased (e.g., so that an occurrence in a portion of the text that has been characterized as boilerplate has a lower weight than an occurrence in a portion of the text not characterized as boilerplate). Also, for example, in some implementations, the system also considers occurrences of aliases for the entity that are not in the text of the resource. For example, the system can consider how frequently an alias for the entity occurs in the resource locator (e.g., a Uniform Resource Locator (URL)) for the resource, how frequently an alias for the entity appears in anchor text for links pointing to the document, and/or how frequently an alias for the entity appears in the text of search queries submitted to a search engine that resulted in a user navigating to the document by selecting a search result identifying the document. One or more of these occurrences can be given an increased weight, e.g., so that they have a greater weight than occurrences in the body of the resource.

Another example factor that can be considered is the connectedness of the entity to the other entities referred to by aliases in the resource. For example, a connectedness score for an entity can be computed based on link scores between the entity and each other entity referred to in the resource. For example, link scores between entities may be obtained from a database such as entity properties database 105.

In some implementations, once the entity to document relevance score for each entity in a given document have been determined, the entity to document relevance scores across the entities may be normalized (e.g., so that the entity to document relevance scores are reduced if there many different entities referenced in the resource).

The entity to document relevance scores for each of the documents associated with the entity may be utilized in determining a score for the entity. For example, an entity $E_1$ may be associated with search result documents $D_1$, $D_2$, and $D_3$ and the entity score for entity $E_1$ may be based on scores related to the relevance of the search result documents $D_1$, $D_2$, and $D_3$ to the entity. For example, the entity to document relevance score for entity $E_1$ may be based on summing the scores for the documents and/or averaging the scores for the documents. In some implementations the entity to document relevance scores for a given entity may be a number from zero to one.

In some implementations the entity score for an entity is based on a relationship between the query and the search result documents associated with the entity and is based on a relationship between the entity and the search result documents associated with the entity. For example, in some implementations the entity score for an entity is obtained by summing the product of the query to document relevance score times the entity to document relevance scores over all documents containing the entity.

For example, an entity $E_1$ may be associated with search result documents $D_1$, $D_2$, and $D_3$ and query to document relevance scores of $QD_1$, $QD_2$, and $QD_3$ may be obtained for those search result documents and entity to document relevance scores of $ED_1$, $ED_2$, and $ED_3$ may be obtained for those search result documents. The entity score for the entity $E_1$ may be $(QD_1*ED_1)+(QD_2*ED_2)+(QD_3*ED_3)$.

Additional and/or alternative calculations of an entity score may be utilized. In some implementations those additional and/or alternative calculations may be based on both the query to document relevance scores and the entity to document relevance scores over one or more documents responsive to the query identified at step 700.

In some implementations a highest ranked entity of the entities for a query may be identified as a dominant entity for that query when the ranking of the highest ranked entity satisfies a threshold, such as a threshold relative to the ranking of a lower ranked entity of the entities. For example, if an entity score for a highest ranked entity of the entities satisfies a threshold relative to the ranking of a lower ranked entity of the entities (e.g., the second highest ranked entity), then it may be identified as a dominant entity for that query.

In some implementations one or more entities associated with the query at step 715 may be removed from being associated with the query based on the ranking determined at step 720. For example, in implementations where a score is assigned to the entities, an entity may be removed from being associated with the query when the score for that entity fails to satisfy a threshold. Also, for example, in some implementations only the top X ranked entities may be associated with a given query (where X represents an integer), wherein those entities that are not in the top X ranked entities are removed from being associated with the query.

In some implementations the association between query received at step 700 and the entities associated with the query at step 715 may be stored in a database such as query to entity association database 125. In some implementations whether an entity is associated with a given query may also be based on the ranking for that entity as determined in step 720. For example, in some implementations even though an entity may be considered a valid interpretation of a query, it may not be stored in the query to entity association database 125 if its ranking fails to satisfy a threshold ranking (e.g., it does not have a score that satisfies a threshold, it is ranked too low relative to other entities).

In some implementation the ranking for each of the entities determined at step 720 may also be stored in a database such as query to entity association database 125. For example, in implementations where entity scores are determined for each of the entities associated with the query, the entity score for each entity for a given query may be stored in the database. For example, for the query "sting" the entity associated with the wrestler may have a first score and the entity associated with the singer may have a second score. Also, for example, each entity for a given query may be identified as the primary, secondary, tertiary, etc. entity for the given query in the database. For example, for the query "sting" the entity associated with the wrestler may be identified as the secondary entity and the entity associated with the singer may be identified as the primary entity.

In some implementations a reduced mapping between queries and entities may be stored in a database such as query to entity association database 125 by filtering out any queries that do not have any entities associated therewith (or only have entities that fail to satisfy a threshold ranking). Any stored data may optionally be associated with a corresponding query in the database for future retrieval in response to a future search request for the query.

Figure 8:
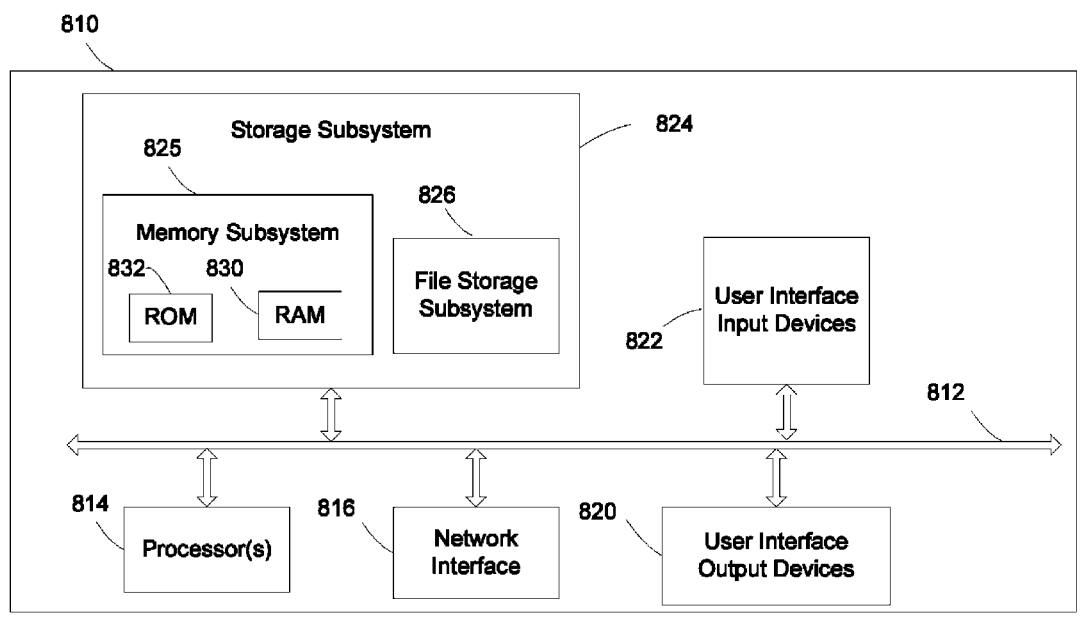
FIG. 8 illustrates an example architecture of a computer system.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 825 and a file storage subsystem 826, user interface input devices 822, user interface output devices 820, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to associate an entity with at least one entity search query; identify an entity search query for an entity; associate a query with at least one entity; provide one or more entity summaries for a query; and/or identify a query suggestion based on a query to entity association.

These software modules are generally executed by processor 814 alone or in combination with other processors. Memory 825 used in the storage subsystem can include a number of memories including a main random access memory (RAM) 830 for storage of instructions and data during program execution and a read only memory (ROM) 832 in which fixed instructions are stored. A file storage subsystem 824 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 824 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

While several inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A computer implemented method, comprising:
creating a query suggestion associated with a single entity, wherein the query suggestion includes first terms and wherein the first terms of the query suggestion include a first group of one or more of the first terms and a second group of one or more of the first terms;
wherein creating the query suggestion associated with the single entity includes:
identifying a plurality of entities associated with the first group of the first terms based on a mapping of the first group of the first terms to the entities, the entities including the single entity,
identifying the second group of the first terms based on at least one property of the single entity, and
creating the query suggestion associated with the single entity by annotating the first group of the first terms with the second group of the first terms;
identifying an entity search query associated with the single entity of the query suggestion, wherein the entity search query is identified based on a mapping of the single entity to the search query, and wherein the entity search query includes second terms, the second terms including at least one term that is not included in the query suggestion;
associating the query suggestion with the second terms of the entity search query so that a user selection of the query suggestion issues a search based on the second terms of the entity search query, including the at least one term that is not included in the query suggestion;
identifying a user selection of the query suggestion; and
in response to the user selection of the query suggestion, submitting the second terms of the entity search query, including the at least one term that is not included in the query suggestion, to a search system.

2. The method of claim 1, further comprising receiving a query, wherein the query suggestion is based on the query.

3. The method of claim 2, wherein the query is a submitted search query, and further comprising providing the query suggestion in combination with search results responsive to the search query.

4. The method of claim 2, wherein the query is a partial search query, and further comprising providing the query suggestion as an autocomplete query suggestion for the partial search query.

5. The method of claim 1, wherein the query suggestion is responsive to a search query associated with the plurality of entities, the single entity being one of the entities.

6. The method of claim 1, further comprising:
identifying one or more second entity properties of a second entity of the entities associated with the first group of the first terms;
creating a second query suggestion associated with the second entity by annotating the first group of the first terms with the second entity properties;
identifying a second entity search query associated with the second entity of the second query suggestion, wherein the second entity search query is identified based on a mapping of the second entity to the second entity search query, and wherein the second entity search query includes at least one third term that is not included in the entity search query;
associating the second query suggestion with the second entity search query so that a user selection of the second query suggestion issues a search based on the second entity search query;
receiving a partial search query of the user;
identifying the query suggestion and the second query suggestion based on the partial search query; and
providing both the query suggestion and the second query suggestion as selectable query suggestions for the partial query.

7. A non-transitory computer readable storage medium storing computer instructions executable by a processor to perform a method comprising:
creating a query suggestion associated with a single entity, wherein the query suggestion includes first terms and wherein the first terms of the query suggestion include a first group of one or more of the first terms and a second group of one or more of the first terms;
wherein creating the query suggestion associated with the single entity includes:
identifying a plurality of entities associated with the first group of the first terms based on a mapping of the first group of the first terms to the entities, the entities including the single entity,
identifying the second group of the first terms based on at least one property of the single entity, and
creating the query suggestion associated with the single entity by annotating the first group of the first terms with the second group of the first terms;
identifying an entity search query associated with the single entity of the query suggestion, wherein the entity search query is identified based on a mapping of the single entity to the search query, and wherein the entity search query includes second terms, the second terms including at least one term that is not included in the query suggestion;
associating the query suggestion with the second terms of the entity search query so that a user selection of the query suggestion issues a search based on the second terms of the entity search query, including the at least one term that is not included in the query suggestion;
identifying a user selection of the query suggestion; and
in response to the user selection of the query suggestion, submitting the second terms of the entity search query, including the at least one term that is not included in the query suggestion, to a search system.

8. The non-transitory computer readable storage medium of claim 7, further comprising receiving a query, wherein the query suggestion is based on the query.

9. The non-transitory computer readable storage medium of claim 8, wherein the query is a submitted search query, and wherein the method further comprises providing the query suggestion in combination with search results responsive to the search query.

10. The non-transitory computer readable storage medium of claim 8, wherein the query is a partial search query, and wherein the method further comprises providing the query suggestion as an autocomplete query suggestion for the partial search query.

11. The non-transitory computer readable storage medium of claim 7, wherein the query suggestion is responsive to a search query associated with the plurality of entities, the single entity being one of the entities.

12. A computer implemented method, comprising:
creating a query suggestion associated with a single entity, wherein the query suggestion includes first terms and wherein the first terms of the query suggestion include a first group of one or more of the first terms and a second group of one or more of the first terms;

wherein creating the query suggestion associated with the single entity includes:
- identifying a plurality of entities associated with the first group of the first terms based on a mapping of the first group of the first terms to the entities, the entities including the single entity,
- identifying the second group of the first terms based on at least one property of the single entity, and
- creating the query suggestion associated with the single entity by annotating the first group of the first terms with the second group of the first terms;

identifying an entity search query associated with the single entity of the query suggestion, wherein the entity search query is identified based on a mapping of the single entity to the search query, wherein the entity search query includes second terms, and wherein the first terms of the query suggestion include at least one term that is not included in the entity search query;

associating the query suggestion with the second terms of the entity search query so that a user selection of the query suggestion issues a search based on the second terms of the entity search query;

identifying a user selection of the query suggestion; and in response to the user selection of the query suggestion, submitting the second terms of the entity search query to a search system without submission of the at least one term of the query suggestion that is not included in the entity search query.

13. The method of claim 12, further comprising:
- identifying one or more second entity properties of a second entity of the entities associated with the first group of the first terms;
- creating a second query suggestion associated with the second entity by annotating the first group of the first terms with the second entity properties;
- identifying a second entity search query associated with the second entity of the second query suggestion, wherein the second entity search query is identified based on a mapping of the second entity to the second entity search query, and wherein the second entity search query includes at least one third term that is not included in the entity search query;
- associating the second query suggestion with the second entity search query so that a user selection of the second query suggestion issues a search based on the second entity search query;
- receiving a partial search query of the user;
- identifying the query suggestion and the second query suggestion based on the partial search query; and
- providing both the query suggestion and the second query suggestion as selectable query suggestions for the partial query.

* * * * *